Nov. 20, 1962 G. R. DEMPSTER ET AL 3,064,852
SUMP-TYPE CONTAINERS
Filed Dec. 15, 1959 4 Sheets-Sheet 1
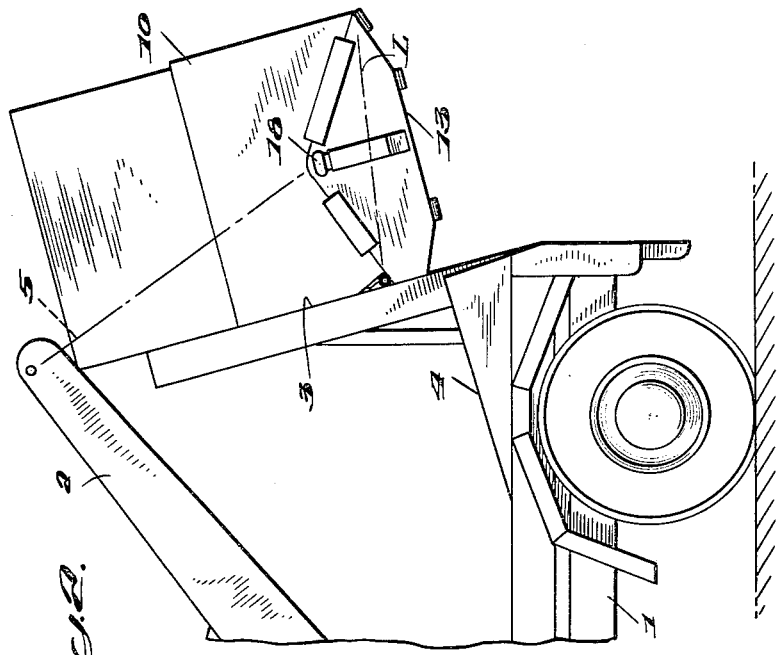
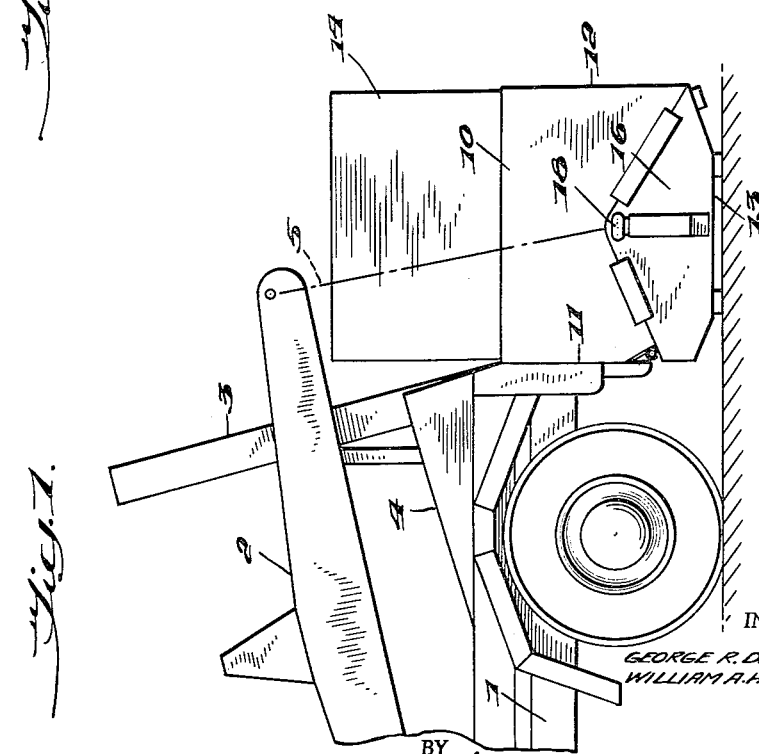
INVENTORS
GEORGE R. DEMPSTER,
WILLIAM A. HERPICH,
BY
ATTORNEYS

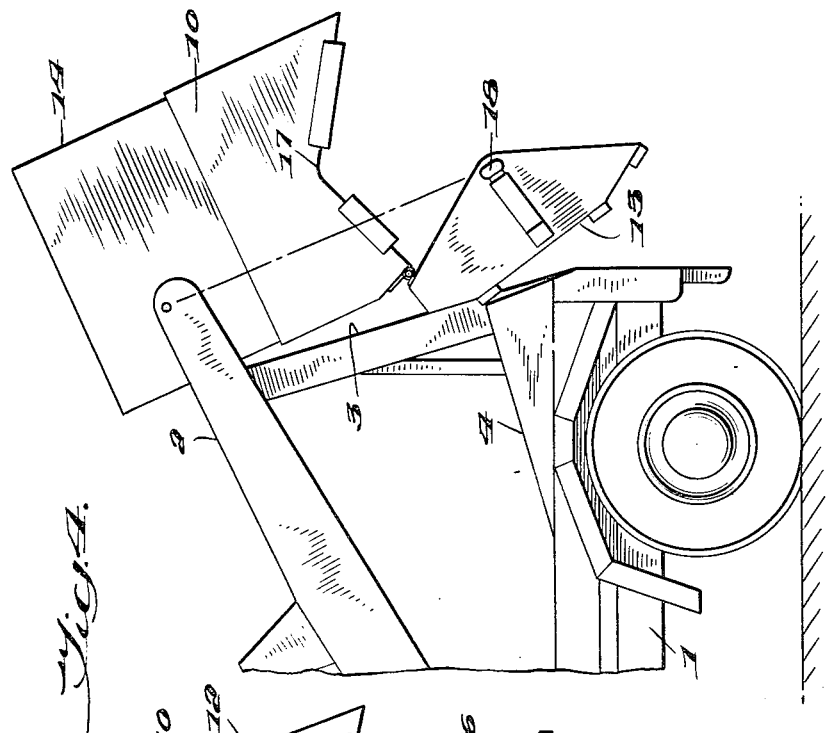
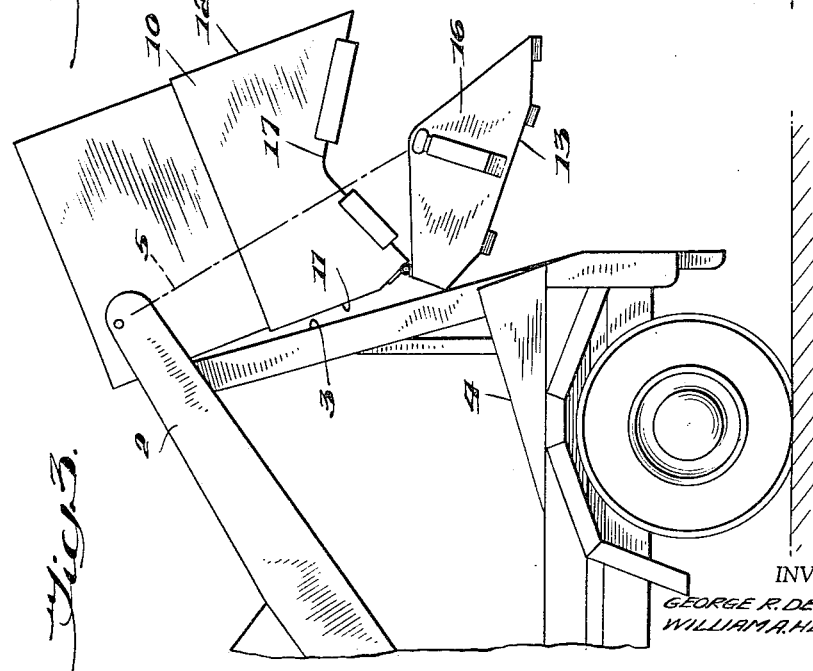

Nov. 20, 1962  G. R. DEMPSTER ET AL  3,064,852
SUMP-TYPE CONTAINERS
Filed Dec. 15, 1959  4 Sheets-Sheet 3
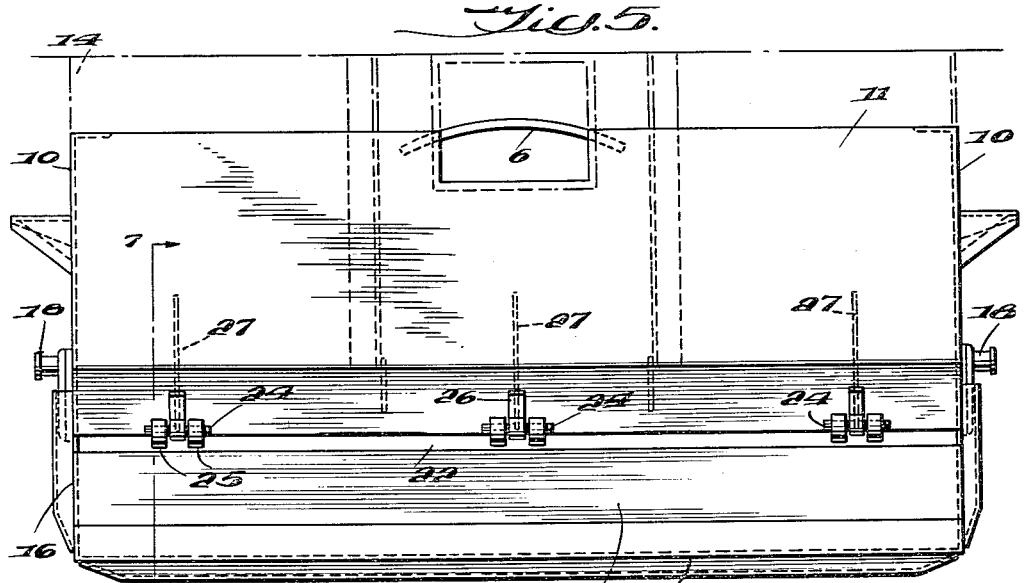
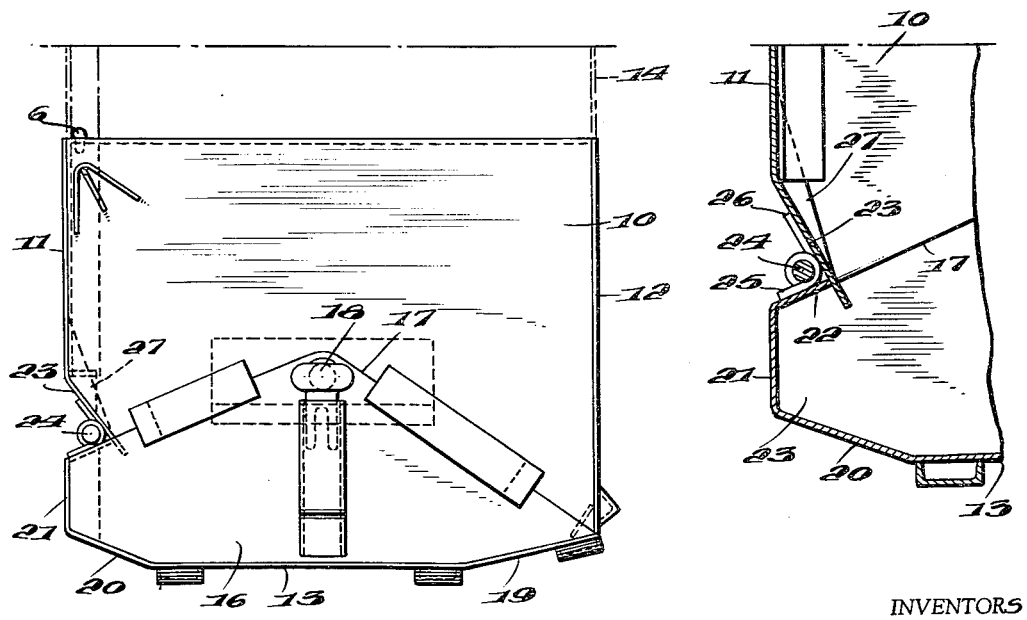
INVENTORS
GEORGE R. DEMPSTER,
WILLIAM A. HERPICH,
BY
ATTORNEYS

INVENTORS
GEORGE R. DEMPSTER,
WILLIAM A. HERPICH,

BY
ATTORNEYS

United States Patent Office 3,064,852
Patented Nov. 20, 1962

3,064,852
SUMP-TYPE CONTAINERS
George R. Dempster and William A. Herpich, Knoxville, Tenn.; said William A. Herpich assignor to Dempster Brothers, Inc., Knoxville, Tenn., a corporation of Tennessee
Filed Dec. 15, 1959, Ser. No. 859,759
5 Claims. (Cl. 220—32)

This invention relates to improvements in sump-type containers and more particularly to the types of containers used for trash, garbage and other refuse containing liquid in or combined with such refuse.

It has been customary to handle refuse containers with transporting and dumping equipment of the types set forth in prior patents, No. 2,281,183, April 28, 1942, and No. 2,369,722, February 20, 1945, as examples of such equipment. Such containers customarily are filled while sitting on the ground or on the floor, street, etc., and thereafter may be picked up by the transporting and dumping equipment on a motor vehicle, on which the container may be transported to the point of dumping, the contents discharged, and returned or hauled to the point of re-use. Frequently, a considerably quantity of liquid may be received in the container, especially when hauling garbage and other materials, but when the container has a drop bottom, as in Patent No. 2,369,722, and is tilted forward on the vehicle in its transport position, the liquid spills out. Furthermore, some of the liquid may leak out at the point of filling and contaminate the spot around the container, so as to be highly objectionable in service.

Various attempts have been made to provide for the sealing of the edges of the drop bottom door to prevent the leakage of liquid therefrom, both when the container is sitting on the ground and when it is tilted forward in carrying position on the vehicle. Such provisions as have been made for this purpose have not been as entirely satisfactory as may be desired and have added considerably to the cost of construction of the container.

One object of this invention is to retain a considerable quantity of liquid within the container while sitting in its position to be filled, and then later, when the container is raised and tilted forward on the transporting equipment in its carrying position, the liquid is retained in the container without danger of leaking out.

A further object of the invention is to provide in a drop bottom container the provision of a sump in the drop bottom door which will receive and enclose the liquid contents thereof and prevent leakage through the crack between the door and container when the container is tilted in carrying position.

Another object of the invention is to improve the construction of the container, both as to the drop bottom door, which is formed to provide a sump for retaining the contents therein even when the container is tilted forward in carrying position, and for covering the crack between the door and the adjacent hinge wall of the container to insure of proper shedding of the contents when the drop bottom door is opened.

These objects may be accomplished, according to one embodiment of the invention, by constructing a drop bottom container with a sump therein which normally contains liquid. This sumps includes a receptacle provided on the drop bottom door which will trap the liquid in the container against leakage when the container is tilted in its carrying position on the vehicle. This provides a leakproof sump with a receptacle of substantial quantity that will allow the container to tip forward to a considerable degree without leakage through the crack between the door and the body of the container.

Provision may be made for covering the crack between the body of the container and the drop bottom door and to shed the contents of the container into the sump provided in the drop bottom door as the latter is opened. The drop bottom door is provided with an upturned portion on the hinged edge thereof, which preferably is substantially in vertical alignment with the front wall of the container and which cooperates with an upturned front edge and with end sections to form a sump of substantial capacity for containing the liquid, both when the container is resting on the ground and when it is tilted forward in carrying position. This upturned forward edge portion is spaced appreciably above the hinge edge of the drop bottom door so as not to leave an appreciable open gap therebetween when the door is dropped open to dump the contents and to allow full opening of the door during dumping The hinge means for supporting the door or bottom portion of the container is located at the upper edge portion of the upturned section of the door between the latter and the front wall of the container, so as substantially to eliminate an undesirable crack between the door and the body portion of the container during dumping of the contents. Moreover, the disposition of the hinge means and the cooperating relation of the portion of the door connected therewith provides for dumping of the contents without appreciable bodily movement of the body portion of the container away from its supported position on the hoisting means.

The invention is illustrated in different embodiments in the accompanying drawings, in which:

FIG. 1 is a diagrammatic side elevation, showing a hoisting unit and container representing one embodiment of the invention, with the container in pick-up position resting on the ground;

FIG. 2 is a similar view, after lifting of the container to elevated position;

FIG. 3 is a similar view, showing the container partially in open position;

FIG. 4 is a similar view, showing the container in full open position;

FIG. 5 is a front elevation of the container;

FIG. 6 is an end elevation thereof;

FIG. 7 is a cross section therethrough on the line 7—7 in FIG. 5;

Figure 8:
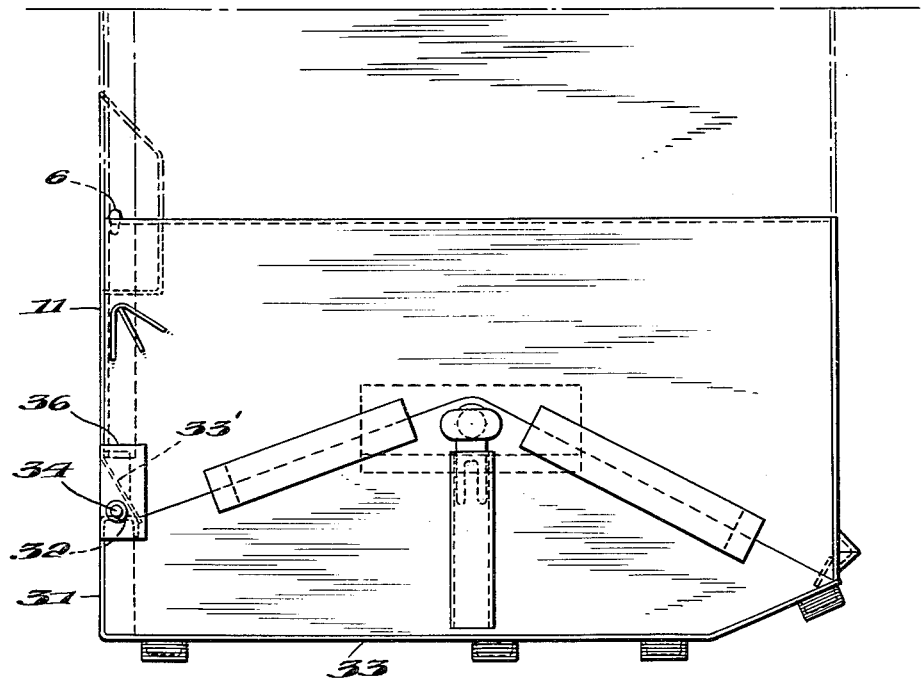
FIG. 8 is an end elevation of a modified form of container embodying this invention.

The invention is adapted to be applied to transporting and dumping equipment of the character generally represented in the prior patent of George R. Dempster, No. 2,369,722, granted February 20, 1945, merely as an example of the type of equipment in connection with which this improved container may be used.

This transporting and dumping equipment includes a motor vehic'e chassis 1 having hoisting means 2 connected therewith for raising the container from the ground against a skid frame 3 and setting it on a container rest 4 provided on the hoisting unit. This rest is usually inclined forwardly of the container during transportation, to hold the container in place thereon. Flexible devices 5 are connected with the hoisting means for engagement with the container to lift the latter, and a dumping hook is mounted on the hoisting unit for engaging with a bail 6 on the container to support the body of the latter during dumping.

The container shown as an embodiment of this invention, for use with the transporting and dumping equipment, is of the cabinet type. However, it will be understood that this invention may be applied to other forms of bottom discharge containers, either open at the top or closed in various ways, and is not to be restricted to the specific form illustrated.

This container is constructed preferably of sheet metal of relatively heavy gauge, according to the size and capacity of the container and the material to be received therein, and is of relatively rigid unitary structure. End walls are shown at 10, front and back walls at 11 and 12, all being formed of suitable steel plates or the like, secured in the desired shape and rigidly connected together either integral or connected by welding or other suitable fastening means to form said ends and sides. The body of the container is open at the bottom except as it is closed by a bottom door 13. A closure may be provided at the top, as illustrated at 14, forming a hood thereover, with one or more openings which may have doors in the end or ends thereof and/or in the top, although this may be changed to any desired extent.

The bottom 13 is provided with upstanding end sections 16, either formed in one integral piece with the bottom or welded or otherwise secured thereto, and shaped to fit in cut-out notches 17 provided in the end walls 10 of the container. The sections 16, if not formed in one integral piece with the bottom 13, may be made by notching out the end plates and using the cut-out portions to form the end sections. These end sections 16 preferably have the lifting pins 18 attached thereto adapted to receive the lifting chains or flexible devices 5 connected with the hoisting unit.

The plate of the drop bottom door 13 has an upturned rearward edge portion 19 which extends in an inclined direction, according to this embodiment of the invention, and is adapted to extend substantially to the lower edge of the rear wall 12 of the container.

The opposite edge portion at the front side of the container is inclined at 20 and terminates in an upturned portion 21 substantially in vertical alignment with the front wall 11 of the body portion of the container. At the upper edge of the portion 21 is formed an inwardly directed portion 22. These portions 20, 21 and 22 form a closed receptacle, generally indicated at 23, extending along the length of the bottom portion of the container and cooperating with the portions 13 and 19 to form a sump bottom which is liquid-tight up to a line from the free edge of the portion 19 to the free edge of the portion 22. This sump, thus formed, has substantial capacity to receive the liquids contained in the refuse and to prevent the liquids from draining out of the bottom portion of the container. The end door sections 16 are sealed, as by welding, to the sections 13, 19, 20, 21 and 22 throughout the contiguous edges thereof.

The front wall 11 of the body portion is provided with an inwardly directed baffle portion 23 on the lower edge thereof extending at an obtuse angle to the plane of the wall 11 and in position for abutting relation thereagainst of the upper edge of the section 22 when the bottom portion is closed, as shown in FIGS. 6 and 7. The section 23 extends downwardly beyond the upper edge of the section 22 sufficiently to cover the crack therebetween. This relation is maintained even when the bottom door section is opened, to insure that refuse will not become wedged in the crack nor leak therethrough while said door section is open.

The bottom door section is hinged to the body portion along an axis adjacent the upper edge of the upturned section 21 to permit the bottom section to open with respect to the body portion.

In the form shown in FIGS. 5 to 7, the hinge means comprises a series of hinges spaced at intervals along the length of the container, as shown in FIG. 5. Each of these hinges comprises a hinge pin 24 connected with straps 25 and 26 mounted, respectively, on the sections 22 and 23 and interconnecting the latter, so as to provide the hinged connection described. A gusset 27 is provided between the wall 11 and the section 23 inwardly of the container opposite each of the hinges 24—26 to reinforce the hinged connections.

In the use of the container, this is normally filled separate and apart from the hoisting unit and may be picked up by the latter in the manner illustrated in FIG. 1.

The flexible devices or chains 5 are connected with the lifting pins 18 when the hoisting boom 2 is lowered, as shown, after which the raising of the boom 2 will move the container vertically along the skid frame 3 to its elevated position. The skid frame 3 is mounted on a power movable carriage whereby it may be shifted forward of the vehicle chassis 1 to permit the container to be set down on the container rest 4 for transportation. After the container has been moved to the point of dumping on the chassis, it is again picked up from the container rest 4 and shifted to the rear position illustrated in FIG. 2, ready for dumping.

The dumping action is accomplished by engagement of the automatic hook provided on the skid frame 3 with the bail 6 to hold the body portion of the container in an elevated position while the bottom section is lowered, as illustrated in FIGS. 3 and 4. Then, upon lowering of the boom 2, the bottom section 13 will drop open around the axis of the hinges 24—26, as is apparent from FIGS. 3 and 4. Some tilting movement of the body portion is permitted while the heel of the bottom section bears against the skid frame 3, but the inclined portion 20 of the bottom section permits the opening of the bottom section to a very wide angle without appreciable tilting of the body portion of the container, as will be apparent from FIG. 4.

During the haul of the container, either suspended, as in FIG. 2, or supported on the container rest 4, the container is normally tilted, as well as during the dumping operation. Any liquids that are entrapped in the refuse will accumulate in the sump bottom of the container, which has substantial capacity for liquids, to a liquid level, as indicated at L in FIG. 2, extending on a line from the free edge of the section 19 to the free edge of the section 22.

The opening of the bottom section provides a wide area of discharge and permits substantially all of the refuse to be discharged away from the hoisting unit without any appreciable liquid through the crack between the bottom section and the body of the container.

Figure 9:
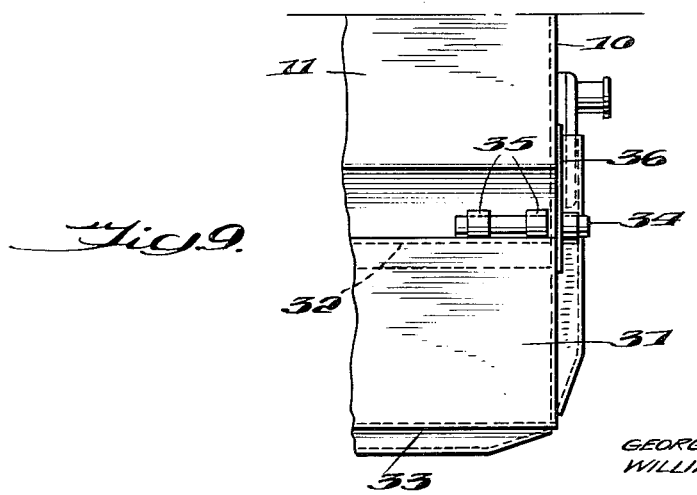
FIG. 9 is a partial front elevation thereof.

The form of the invention illustrated in FIGS. 8 and 9 differs from that described above only in the shape of the sump bottom section and in the character of the hinge means. In this form, the bottom section 33 has a vertically extended edge portion 31 which is arranged substantially in vertical alignment with the front wall 11 of the container. The upturned section 31 is, in turn, directed inwardly at 32 beneath an angular portion 33' on the front wall 11.

The hinge means comprises a hinge pin 34 engaging in loops 35 on the inturned section 32 at opposite ends of the container and with straps 36 attached to the end walls 10 of the container.

In other respects, this form of the invention is constructed and functions substantially as described above. The sump in the bottom section 33 extends from the free end edge of said section to the upper edge of the inturned section 32.

While the invention has been illustrated and described in certain embodiments, it is recognized that other variations and changes may be made therein without departing from the invention as set forth in the claims.

We claim:

1. A container of the character described comprising front, rear and end walls, a bottom door having upturned opposite end portions and with an upturned forward edge portion extending substantially to the lower edge of the front wall and substantially in alignment therewith when the door is closed, means hinging the top of the upturned forward edge of the door to the front wall portion of the container for opening movement relative thereto, means at the top of the upturned forward edge for recessing the hinging means, and means forming a liquid receptacle within the bottom door open to the interior of the container to receive liquid therefrom and extending along said hinge edge portion thereof.

2. A container of the character described comprising front, rear and end walls and a bottom door for closing the bottom portion of the container, said bottom door having upturned opposite end portions and having an upturned front edge portion extending substantially in vertical alignment with the front wall when the door is closed and cooperating with the upturned end portions to form a liquid receptacle along the forward edge of the door open to the interior of the container to receive liquid therefrom, and means hinging the upper edge portion of said upturned front edge portion substantially to the lower edge of the front wall, said upturned front edge portion having an inwardly extending portion at the upper edge thereof along the upper edge of the liquid receptacle, which inwardly extending portion engages the outside of the front wall adjacent the hinging means when the door is closed.

3. A container of the character described comprising front, rear and end walls and a bottom door for closing the bottom portion of the container, said bottom door having upturned opposite end portions and having an upturned front edge portion extending substantially in vertical alignment with the front wall when the door is closed and cooperating with the upturned end portions to form a liquid receptacle along the forward edge of the door open to the interior of the container to receive liquid therefrom, means hinging the upper edge portion of said upturned front edge portion substantially to the lower edge of the front wall, said upturned front edge portion having an inwardly extending portion at the upper edge thereof along the upper edge of the liquid receptacle, and the front wall having an inwardly directed baffle portion overlapping and engageable by the inwardly directed portion of the bottom section, said inwardly extending portion of the upturned door section and said inwardly directed baffle portion forming a recess receiving therein the hinging means.

4. A container of the character described comprising a body having front, rear and end walls; a bottom door for closing the bottom of the body and holding liquids therein, said door including a bottom section, an upturned portion extending rearwardly from the bottom section and adapted to fit with the lower edge of the rear wall of the body, and an upper portion extending upwardly from the bottom section and in alignment with the front wall of the body when the door is closed; means hingedly connecting the upper edge of the upper portion to the front wall, and means between the top of the upper portion and the bottom of the front wall for recessing the connecting means and cooperating for covering any opening between the door and the front wall.

5. A container of the character described comprising a body having front, rear and end walls; a bottom door for closing the bottom of the body and holding liquids therein, said door including a bottom section, an upturned portion extending rearwardly from the bottom section and adapted to fit with the lower edge of the rear wall of the body, an upper portion extending upwardly from the bottom section and in alignment with the front wall of the body when the door is closed, and an upper section on the upper portion extending inwardly with respect to the body; a lower section on the front wall of the body extending inwardly with respect to the body and cooperating with the upper section to seal the front of the container when the door is closed; and hinge means between the upper section and the lower section for hinging the door to the body.

References Cited in the file of this patent

UNITED STATES PATENTS 2,772,919    Jones _____ Dec. 4, 1956
2,899,092    Olsyewski _____ Aug. 11, 1959

FOREIGN PATENTS 573,292    Canada _____ Mar. 31, 1959